United States Patent [19]

Kakuyama

[11] Patent Number: 5,257,111
[45] Date of Patent: Oct. 26, 1993

[54] CONTINUOUS BOTH-SIDE PLAYBACK TYPE VIDEO DISC APPARATUS

[75] Inventor: Shinji Kakuyama, Tokyo, Japan

[73] Assignee: Sony Corporation, Tokyo, Japan

[21] Appl. No.: 679,314

[22] Filed: Apr. 2, 1991

[30] Foreign Application Priority Data

Apr. 6, 1990 [JP] Japan ................................. 2-91504

[51] Int. Cl.$^5$ .............................................. G11B 7/00
[52] U.S. Cl. ................................. 358/342; 358/335; 360/13; 360/15; 369/47; 369/85; 369/195; 369/199
[58] Field of Search ............. 358/335, 342, 311; 360/13, 14.1, 14.2, 14.3, 15, 79; 369/195, 199, 47, 85

[56] References Cited

U.S. PATENT DOCUMENTS

| | | | |
|---|---|---|---|
| 3,906,169 | 9/1975 | Iwase et al. | 369/85 |
| 4,903,140 | 2/1990 | Okamoto et al. | 358/342 |
| 4,916,681 | 4/1990 | Takamatsu | 369/85 |
| 5,097,461 | 3/1992 | Majima | 360/15 |

*Primary Examiner*—Tommy P. Chin
*Assistant Examiner*—Huy Nguyen
*Attorney, Agent, or Firm*—Lewis H. Eslinger; Jay H. Maioli

[57] ABSTRACT

A continuous both-side playback type video disc apparatus having an external command signal generator for generating an external command signal to an external recorder in response to a playback start signal or a lead-in or lead-out track detection signal obtained from a signal reading head, and also an external command signal output terminal for supplying the external command signal therefrom. Synchronized operation control is executed in such a manner that, upon completion of playing back one side of a disc, the recording operation of the external recorder is temporarily brought to a halt by a pause signal at the instant of detection of the lead-out track by the signal reading head, and after proceeding to playback of the other side of the disc, the recording operation is resumed at the instant of detection of the lead-in track on the other side of the disc by the signal reading head. The known operational intricacy in a dubbing mode can be diminished, and the conventional drawbacks are eliminated, including inclusive of partial signal dropouts induced in proceeding from one side of the disc to the other side and also any wasteful recording space that may otherwise result from the existence of no-signal portions.

4 Claims, 2 Drawing Sheets

CONTINUOUS BOTH-SIDE PLAYBACK TYPE VIDEO DISC APPARATUS

BACKGROUND OF THE INVENTION

1. Field of the Invention

The present invention relates to a novel video disc apparatus having a continuous both-side playback function. And more particularly, it relates to a novel video disc apparatus capable of continuously playing back both sides of a disc by a single signal read means without the necessity of turning over the disc in such a manner that the operational facility in a reproduced-signal dubbing mode can be enhanced and a recording space relative to a dubbing medium is efficicnetly utilizable.

2. Description of the Prior Art

There is known a continuous both-side playback type laser disc apparatus which is capable of automatically performing a continuous playback operation for both sides of a disc by means of a single optical pickup without the necessity of turning over the disc. In case the contents are mutually correlated with regard to the information recorded on both sides of the disc, there exists an advantage that the operational intricacy derived from turning over the disc for playback of its both sides can be eliminated. An exemplary conventional apparatus of such type is disclosed in Japanese Patent Application No. Hei 1 (1989)-87712 filed by the present applicant.

In the apparatus of the type mentioned, when a reproduced video signal or the like is dubbed by the use of an external recording apparatus such as a video tape recorder, it is customary that such operation is performed by manually actuating a control switch and so forth in each apparatus or through remote control.

More specifically, first the video tape recorder is set in a standby state to wait for a recording operation, then the laser disc apparatus is placed in a playback mode, and simultaneously the video tape recorder is released from the standby state to thereby start its recording operation.

Thereafter, upon completion of playing back one side of the disc (or at a preset instant when the playback completion time relative to one side of the disc is previously found), the video tape recorder is placed in the recording standby state again.

Subsequently in the laser disc apparatus, a certain period of time is required for proceeding to a playback mode relative to the other side of the disc. More specifically, a time period of ten and odd seconds or so is required for moving the optical pickup opposite to the other side of the disc by inverting the rotational direction of the disc by reversing a spindle motor.

And at the instant to start playback of the other side of the disc, the video tape recorder being held in the standby state is placed in a recording mode.

However, according to the procedure mentioned above, operational intricacy is unavoidable when playback is switched from one side of the disc to the other side, since it is necessary to hold the external recorder temporarily in a standby state and then to resume the recording mode by releasing the same from the standby state. Furthermore, such apparatus needs to be performed at exact timing for averting discontinuity of recorded contents with partial dropouts of recorded signals or for preventing wasteful blank portions where no signal is existent.

OBJECT AND SUMMARY OF THE INVENTION

It is therefore an object of the present invention to provide an improved video disc apparatus of continuous both-side playback type wherein the above-described operational intricacy in a dubbing mode can be diminished, and the aforementioned drawbacks are eliminated, including partial signal dropouts induced in proceeding from one side of a disc to the other side and also any wasteful recording space that may otherwise result from the existence of no-signal portions.

For the purpose of achieving the object mentioned, the video disc apparatus of the present invention has an external command signal generator for generating an external command signal to an external recorder in response to a playback start signal or a lead-in or lead-out track detection signal obtained from a signal read means, and also has an external command signal output terminal for supplying the external command signal therefrom. And synchronized operation control is executed in such a manner that, upon completion of playing back one side of a disc, the recording operation of the external recorder is temporarily brought to a halt by a pause signal at the instant of detection of the lead-out track by the signal read means, and after proceeding to playback of the other side of the disc, the recording operation is resumed at the instant of detection of the lead-in track on the other side of the disc by the signal read means.

According to one aspect of the present invention, there is provided an improved video disc apparatus which is capable of continuously playing back both sides of a disc by a single signal read means without the necessity of turning over the disc. At the start of a playback operation relative to one side of a disc, an external command signal is generated for placing an external recorder in a standby state, and simultaneously a signal read means is moved via a feed mechanism. And upon subsequent detection of a lead-in track on one side of the disc by the signal read means, a signal is generated to release the external recorder from the standby state to thereby start its recording operation. Thereafter, upon completion of playing back one side of the disc, a pause signal for temporarily halting the recording operation is generated in response to detection of the lead-out track by the signal read means, so that the operation proceeds to playback of the other side with the signal read means moved by the feed mechanism. Subsequently, in response to detection of the lead-in track on the other or reverse side of the disc, a signal is generated for resuming the recording operation being temporarily halted. And upon completion of playing back the reverse side of the disc, a signal is generated for halting the recording operation.

Therefore, in proceeding from one side of the disc to the other or reverse side thereof, an external command signal is transmitted from the disc apparatus to the external recorder for temporarily halting the recording operation of the latter. And the recording operation is resumed in synchronism with the start of playing back the other side, so that the known operational intricacy is eliminated with another advantage of retaining the continuity with regard to the recorded contents, thereby realizing effective utilization of the recording space.

The above and other features and advantages of the present invention will become apparent from the following description which will be given with reference to the illustrative accompanying drawings.

DESCRIPTION OF THE PREFERRED EMBODIMENT

Hereinafter the continuous both-side playback type video disc apparatus of the present invention will be described in detail with reference to a preferred embodiment shown in the accompanying drawings. This embodiment represents an exemplary case of applying the present invention to a laser disc player.

Figure 1:
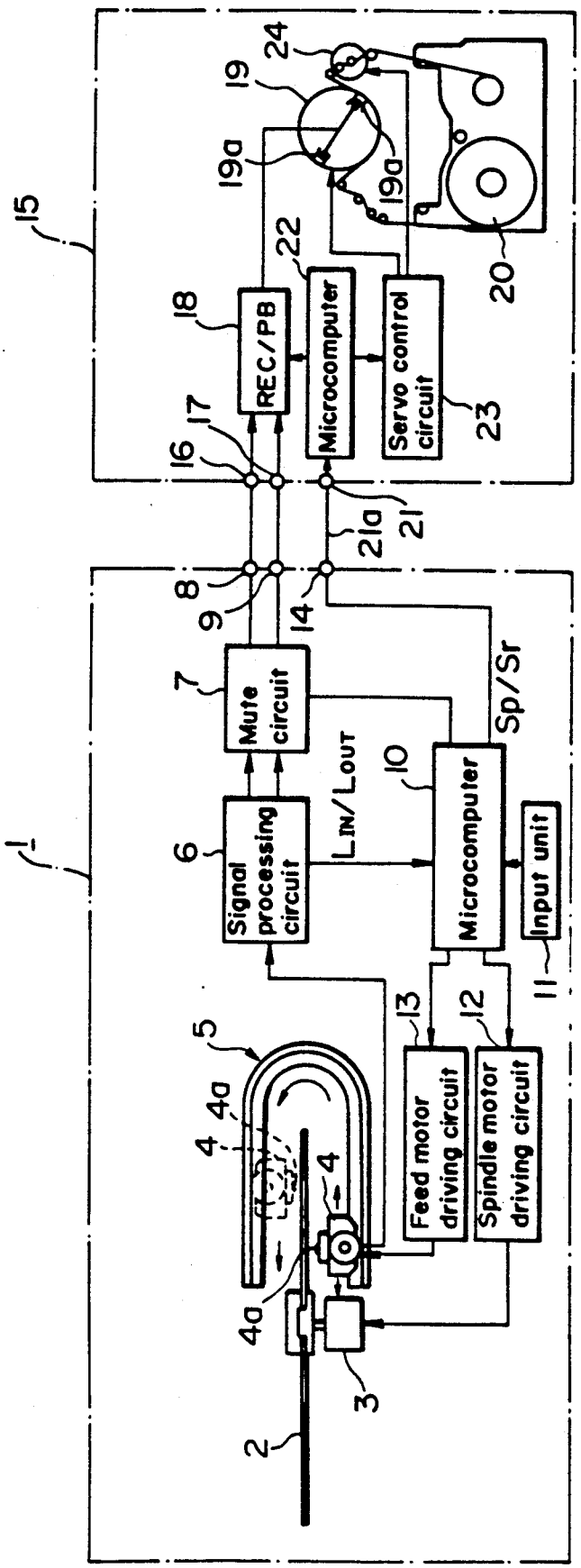
FIG. 1 is a schematic circuit block diagram of an exemplary continuous both-side playback type video disc apparatus embodying the present invention.

In FIG. 1, reference numeral 1 denotes a laser disc player (hereinafter abbreviated to LDP) which comprises a spindle motor 3 for rotating a disc 2 and an optical pickup 4 for reading recorded information from the disc 2.

Denoted by 5 is a feed mechanism for moving the optical pickup 4 in compliance with a predetermined track. As illustrated schematically in FIG. 1, the optical pickup 4 furnished with an unshown feed motor is supported to be slidable in the radial direction of the disc 2 along the feed mechanism 5 while its objective lens 4a is held opposite to one side of the disc 2. As indicated by a broken line in FIG. 1, the optical pickup 4 is rendered slidable in the radial direction of the disc 2 when inverted with the objective lens 4a thereof turned opposite to the other side of the disc 2. The feed mechanism 5 serves to realize continuous playback of both sides of the disc 2 without the necessity of turning it over.

Reference numeral 6 denotes a signal processing circuit for executing demodulation and so forth of the reproduced signal obtained from the optical pickup 4 to thereby convert the same into a video signal and an audio signal, and sending the processed signals via a mute circuit 7 to a video signal output terminal 8 and an audio signal output terminal 9 respectively.

In response to detection of a signal recorded in a lead-in or lead-out track on the disc 2, the signal processing circuit 6 generates a detection signal and supplies the same to an undermentioned microcomputer. (Hereinafter a lead-in detection signal and a lead-out detection signal will be referred to as $L_{IN}$ and $L_{OUT}$ respectively.) The lead-in track and the lead-out track are formed respectively at a position proximate to the innermost portion of the disc 2 and at a position proximate to the outermost portion of the disc 2 in a manner to surround the recording area therebetween. Such positions are so determined that laser light emitted from the optical pickup 4 is not irradiated outside the area between the two lead tracks.

There is also shown a microcomputer 10 which controls the components of the LDP 1 in accordance with a lead-in or lead-out detection signal received from the signal processing circuit 6 or a command signal from an input unit 11 inclusive of control switches. And in response to such input signals, the microcomputer 10 supplies a control signal to a spindle motor driving circuit 12 for controlling the rotation of the spindle motor 3, or a control signal to a feed motor driving circuit 13 for controlling the motion of the optical pickup 4 in compliance with the feed mechanism 5. The microcomputer 10 further generates various command signals for the external apparatus, such as a pause signal Sp for setting the external recorder in a standby state, or a release signal Sr for releasing the external recorder from the standby state to thereby start a recording operation, and supplies such signal to a control signal output terminal 14, hence controlling the operation of the external recorder.

Denoted by 15 is a video tape recorder (VTR) used as an external recording apparatus. When a video signal and an audio signal are transmitted from the LDP 1 via connection cords to a video signal input terminal 16 and an audio signal input terminal 17 respectively, such signals are first processed by a recording/playback circuit 18 and then are recorded on a magnetic tape 20 by means of magnetic heads 19a, 19a provided on a rotary head drum 19.

Denoted by 21 is a control signal input terminal connected via a control signal line 21a to the control signal output terminal 14 of the LDP 1.

Further shown is a microcomputer 22 for the VTR 15. In response to a command signal received from the LDP 1 via the control signal input terminal 21, the microcomputer 22 controls a drum motor for the rotary head drum 19 or a capstan motor 24 via a servo control circuit 23.

The signal reproduced by the LDP 1 is recorded by the VTR 15 in the following manner.

Figure 2:
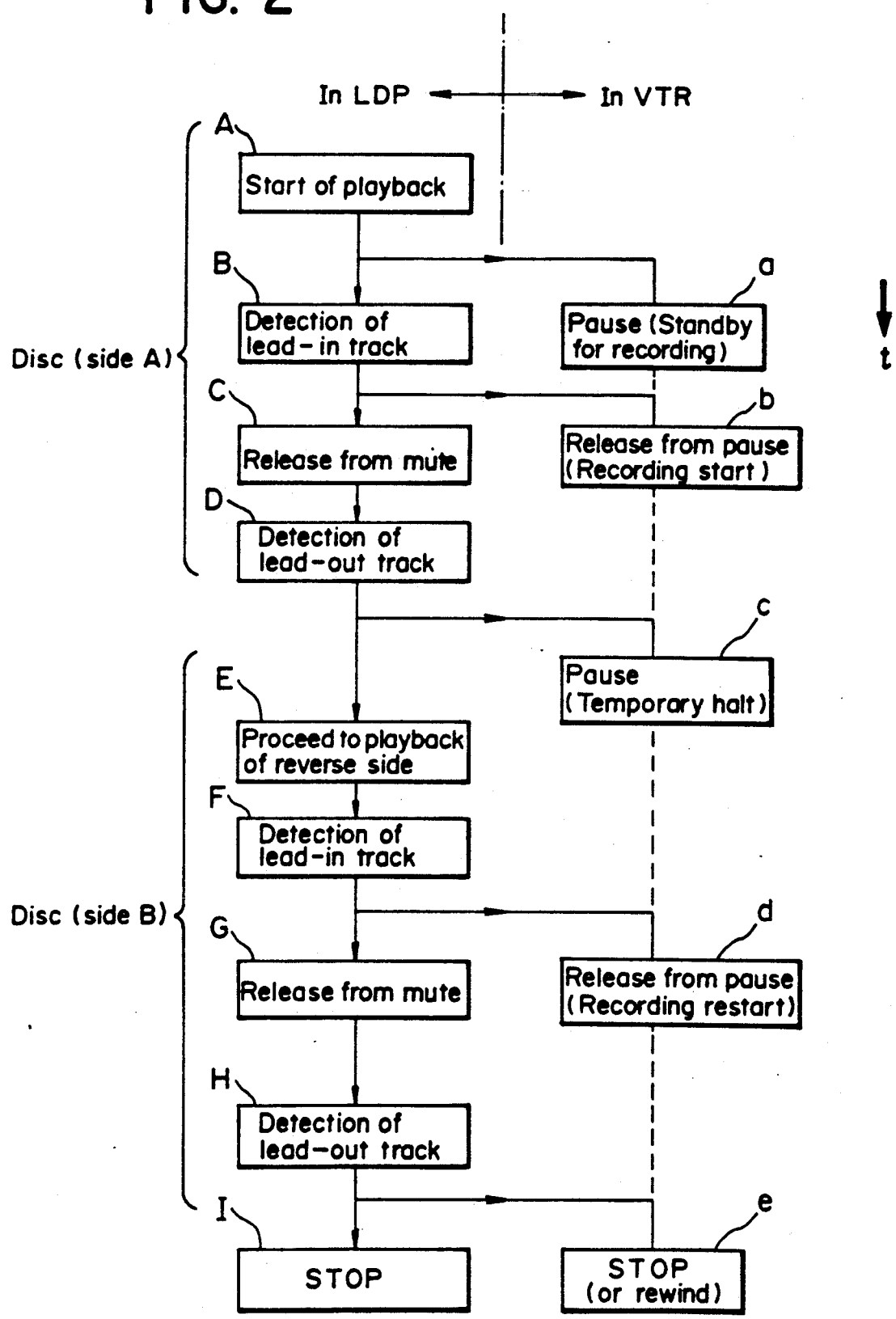
FIG. 2 shows an operating procedure executed in a dubbing mode in the apparatus of FIG. 1.

FIG. 2 shows the operating procedures of the LDP 1 and the VTR 15 executed in recording input signals on one side (side A) of the disc 2 and then recording the signals successively on the other side (side B). In this diagram, a downward arrow t directionally indicates the lapse of time with regard to the sequence of operations.

A) Start of playback

First in playing back the side A of the disc 2, a playback operation is started by depressing a playback button which is a component element of the input unit 11. Then, in the LDP 1, detection of the lead-in track on the disc 2 is executed. Meanwhile the VTR 15 is set in a recording standby state (a) by a pause command signal Sp supplied from the microcomputer 10 of the LDP 1 via the control signal line 21a to the VTR 15.

B) Detection of lead-in track

The microcomputer 10 sends a control signal to the feed motor driving circuit 13, which then moves the optical pickup 4 toward the innermost portion of the disc 2 in the radial direction of the side A, thereby enabling the optical pickup 4 to read the recorded signal. In this stage, the microcomputer 10 sends a mute signal to the mute circuit 7 so that the reproduced signal is not outputted to the external circuit.

When the recorded signal has been read out from the lead-in track by the optical pickup 4, a lead-in detection signal $L_{IN}$ is supplied from the signal processing circuit 6 to the microcomputer 10, so that the operation of the microcomputer 10 proceeds to a next step (C) of release from the mute, and simultaneously a pause release signal Sr is supplied via the control signal line 21a to the microcomputer 22 of the VTR 15 to thereby start a recording operation (b).

C) Release from mute

The mute is switched off by the control signal sent from the microcomputer 10 to the mute circuit 7, and the reproduced signal from the side A is supplied to the VTR 15, whereby a dubbing operation is started.

D) Detection of lead-out track

Upon completion of the playback relative to the side A, the recorded signal on the lead-out track is read out therefrom, and then a lead-out detection signal $L_{OUT}$ is supplied from the signal processing circuit 6 to the microcomputer 10. In response to such detection signal $L_{OUT}$, the operation of the microcomputer 10 proceeds to playback of the reverse side, while a pause signal Sp is supplied via the control signal line 21a to the VTR 15 to thereby halt the recording operation temporarily (c).

E) Proceed to playback of reverse side

A control signal is sent from the microcomputer 10 to the feed motor driving circuit 13 for moving the optical pickup 4 in compliance with the feed mechanism, and then the optical pickup 4 is inverted to be ready for reading out the information from the side B. Meanwhile the rotation of the spindle motor 3 is brought to a halt by a control signal sent to the spindle motor driving circuit 12, and thereafter the rotational direction is reversed.

During such period, the reproduced signal is muted and the recording operation of the VTR 15 is temporarily paused, so that no dubbing is performed.

F) Detection of lead-in track

When the recorded signal has been read out from the lead-in track on the side B by the optical pickup 4, a lead-in detection signal $L_{IN}$ is supplied from the signal processing circuit 6 to the microcomputer 10, which then executes a next step (G) of release from the mute while sending a pause release signal Sr to the VTR 15, thereby resuming the recording operation (d).

G) Release from mute

The reproduced signal is released from the muted state, so that the video signal and the audio signal are supplied to the VTR 15, and a dubbing operation relative to the side B is started.

H) Detection of lead-out track

Upon completion of playing back the side B, the recorded signal is detected from the lead-out track by the optical pickup 4, and then a lead-out detection signal $L_{OUT}$ is sent from the signal processing circuit 6 to the microcomputer 10.

As a result, the playback operation of the LDP 1 is brought to a stop (I), and the recording operation of the VTR 15 is also brought to a stop by the command signal supplied from the LDP 1 to the VTR 15. Thereafter the magnetic tape is rewound (e) to consequently terminate a series of the entire operations.

According to the LDP 1 mentioned above, the recording operation of the VTR 15 is temporarily halted upon detection of the lead-out track after playback of one side of the disc 2, and the recording operation is resumed in response to detection of the lead-in track on the reverse side of the disc 2, hence eliminating the known fault that a no-signal portion is formed on the magnetic tape corresponding to the time required for proceeding to playback of the reverse side.

Transmission of a command signal (Sp or Sr) to the VTR 15 upon detection of the lead-in or lead-out track is executed for the purpose of accurately ensuring the timing to generate the command signal.

More specifically, with regard to a recording medium such as a CLV (constant linear velocity) disc where data representative of the elapse time is recorded, there may be contrived a procedure of previously confirming the required playback time and sending a command signal to the external apparatus at the instant of playback termination relative to one side of the disc. However, on some discs manufactured earlier, the data representative of the elapse time is not always exact (on the order of seconds) or such data is not recorded at all. Therefore, on the basis of the fact that a lead-in track or a lead-out track is existent on each laser disc without fail, there is employed the procedure of outputting a predetermined command signal (Sp or Sr) to an external recorder in response to detection of such lead track.

As apparent from the description given hereinabove, it is possible in the video disc apparatus of the present invention to perform continuous playback of both sides of a disc while moving a signal read means by a feed mechanism without the necessity of turning over the disc and delivering reproduced signals to a signal output terminal. The present invention is so contrived as to include an external command signal generator for generating an external command signal to an external recorder in response to a playback start signal or a lead-in or lead-out track detection signal obtained from a read means, and an external command signal output terminal for supplying the external command signal therefrom. At the start of a playback operation relative to one side of the disc, a recording standby signal is generated as the external command signal, and simultaneously the signal read means is moved via the feed mechanism. Thereafter, in response to detection of the lead-in track on one side of the disc by the signal read means, a recording start signal is generated for releasing the external recorder from the standby state and starting its recording operation. Subsequently, upon completion of playing back one side of the disc, a pause signal is generated for temporarily halting the recording operation in response to detection of the lead-out track by the signal read means. Then the signal read means is moved by the feed mechanism, and the operation proceeds to playback of the other or reverse side of the disc. Thereafter, in response to detection of the lead-in track on the reverse side, a pause release signal is generated to resume the recording operation being kept at a temporary halt. And upon completion of playing back the reverse side, a stop signal is generated to stop the recording operation.

Thus, according to the video disc apparatus of the present invention, an external command signal is supplied therefrom to an external recorder at the proceeding of playback from one side of a disc to the other side, whereby the recording operation of the external recorder is temporarily halted with a pause, and thereafter the recording operation is resumed in synchronism with start of playback of the other wide, hence eliminating the known operational intricacy. And it is further possible to retain the continuity of the recorded contents while achieving effective use of the recording space.

Although the above embodiment represents an exemplary apparatus where a single disc is loaded, it is to be understood that the present invention is not limited to such example alone, and the technical scope thereof is not restricted at all by the embodiment mentioned. The present invention is applicable also to an apparatus having a disc changer with a capability of continuously playing back a plurality of discs, and a variety of changes and modifications may be attained within the scope not departing from the inventive concept thereof.

What is claimed is:

1. Apparatus for effecting playback of both sides of a video disc without turning the disc over and for generating in response to the playback recording signals for recording on an external recorder, wherein the disc has a lead-out signal recorded on a first side thereof and a lead-in signal recorded on second side thereof and wherein the apparatus comprises:

signal read means for reading from the video disc signals including the lead-out and lead-in signals;

a feed mechanism for moving the signal read means relative to the disc to enable the signal read means to read signals from the first and second sides of the disc in sequence;

an external command signal generator for generating an external command signal; and an external command signal output terminal for supplying the external command signal to the external recorder;

the external command signal including:

a pause signal for effecting a pause in the recording by the external recorder generated in response to reading out of the lead-out signal on the first side while the feed mechanism moves the signal read means to the second side; and a pause release signal generated in response to reading out of the lead-in signal on the second side to restart the recording by the external recorder.

2. Apparatus according to claim 1 wherein the external command signal further includes a recording standby signal generated at the start of the playback of the first side to place the external recorder in a standby condition.

3. Apparatus according to claim 2 wherein a lead-in signal is recorded on the first side and the external command signal further includes a recording start signal generated in response to the lead-in signal recorded on the first side to release the external recorder from the standby condition so that it starts recording.

4. Apparatus according to claim 1 wherein the external command signal further includes a stop signal generated upon completion of the playback to stop the recording.

* * * * *